INVENTORS
THEODORE B. BRUCE and
JOHN F. NELSON
By Donald G. Dalton
Attorney

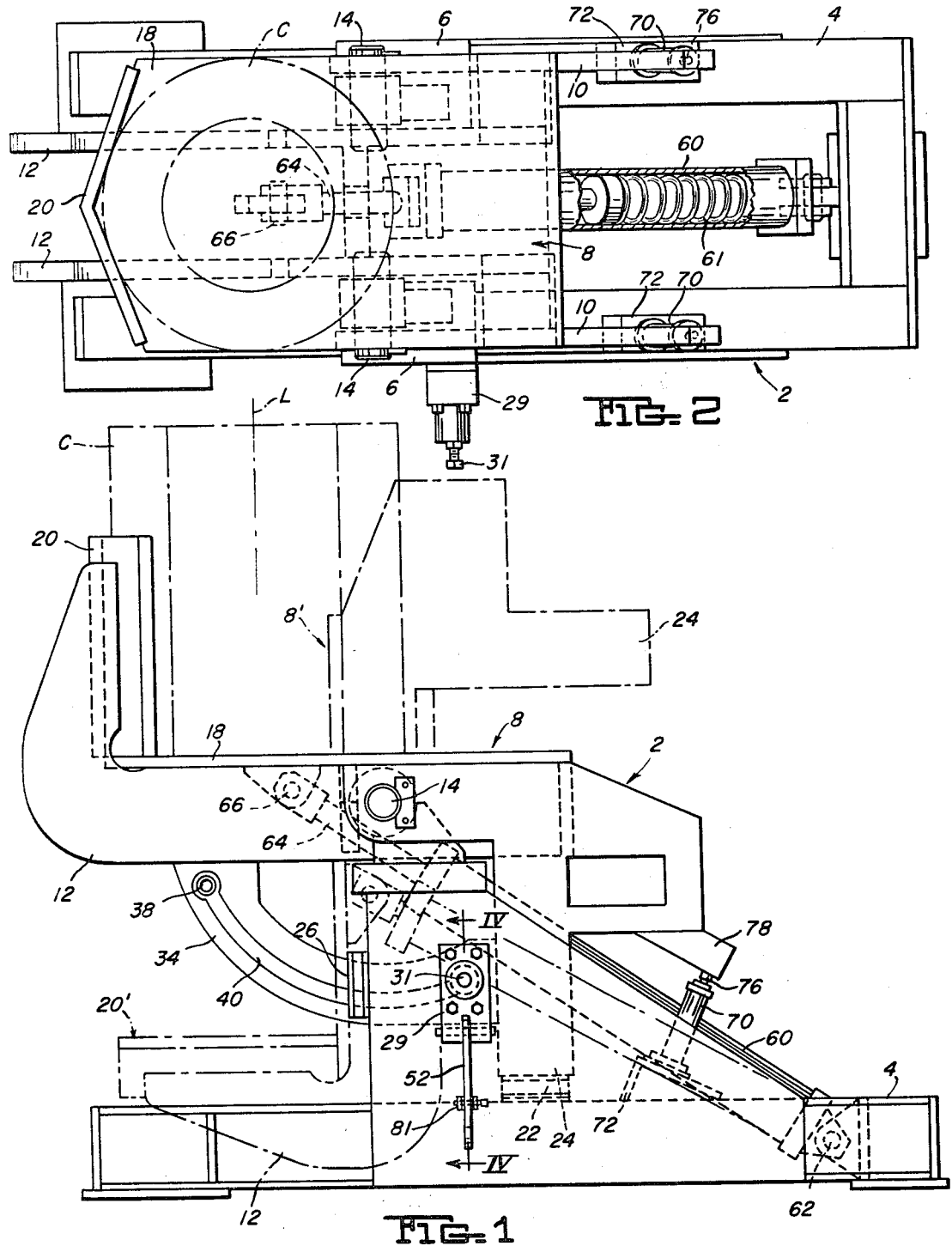

United States Patent Office 3,395,813
Patented Aug. 6, 1968

3,395,813
APPARATUS FOR TURNING PRODUCTS
Theodore B. Bruce, Lafayette, and John F. Nelson, Concord, Calif., assignors to United States Steel Corporation, a corporation of Delaware
Filed Sept. 9, 1966, Ser. No. 578,398
6 Claims. (Cl. 214—1)

ABSTRACT OF THE DISCLOSURE

An apparatus for turning a product supported upon a rotatably mounted beam. Stops engage the beam in its elevated position and in its lowered position. Energy absorbing and shock absorbing cylinders dampen the motion of the beams.

This invention relates to apparatus for turning products, particularly heavy products such as steel coils or heavy pieces of machinery.

One of the problems with prior apparatus designed for turning heavy products has resided in the power supplies that are needed for their operation. Not only is the power consumed by such apparatus expensive, but the motors, gear boxes and other associated equipment are heavy to move and frequently take up large amounts of space. Furthermore, it is often inconvenient to connect the electric cables or fluid hoses that are needed by such power equipment, such as when the turning apparatus is used on a shipping dock or in any large open area where there are no nearby power supply lines.

An object of our invention is to provide apparatus that will turn heavy products by using the weight of the products to supply the force needed for the turning operation, and will not require any other source of power either for turning the products or for returning the apparatus to its original position after the product is turned.

Another object of our invention is to provide a product turning apparatus that will turn the product with a smooth motion so as to prevent the product from falling off the apparatus or in other ways causing damage to the product.

These and other objects will be more apparent from the following description of our invention and the attached drawings, in which:

FIGURE 1 is a side elevation of a coil turning apparatus;

FIGURE 2 is a plan view of the apparatus of FIGURE 1;

Figure 3:
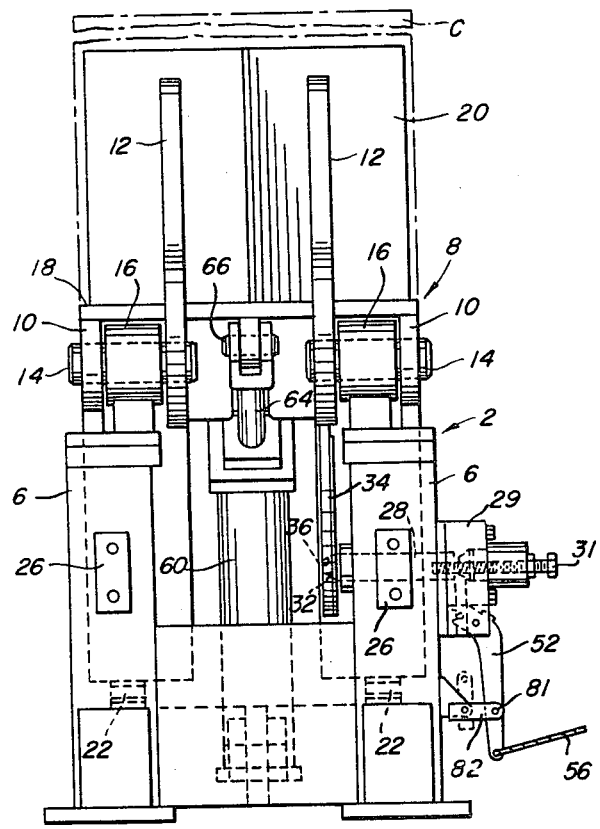
FIGURE 3 is a left hand end view of the apparatus of FIGURE 1.

Apparatus 2, shown in the above figures, is an embodiment of my invention designed for receiving a coil C with its center line L in a vertical position (FIGURE 1), and rotating the coil until its center line L is horizontal. The apparatus 2 includes a base 4 with vertical support members 6 (FIGURE 3). On top of the support members 6 is rotatably mounted a beam 8 which has depending flanges 10 and 12. Pins 14 are mounted between each flange 10 and flange 12, and they are fixed to these flanges while rotating within bearing blocks 16 on top of the support members 6.

The beam 8 also includes a platform 18 on which sits a coil C, shown in chain lines. On the left hand end of the beam 8, as viewed in FIGURES 1 and 2, is mounted a cardle member 20, which is bent to hold a cylindrical product, such as coil C. If the coil is to be deposited on apparatus 2 with its center line horizontal instead of vertical, the member 20 should be made of a flat plate to support the end of the coil, while the platform 18 is bent to hold the cylindrical surface of the coil.

The beam 8 is rotatable about the pin 14 between its solid line position (FIGURE 1) to a chain line position 8′ which is at right angles to the solid line position. A pair of stops in the form of resilient bumpers 22 are mounted on the base 4 and are positioned for engagement with legs 24 which depend from the beam 8. The bumpers 22, both of which may be seen in dotted lines in FIGURE 3, support the beam 8 when it is in its solid line position of FIGURE 1. Another pair of resilient bumpers 26 are mounted on the left hand side of support members 6 and are positioned to contact the underside of platform 18 and stop the rotation of beam 8 in its chain line position 8′ (FIGURE 1).

Figure 4:
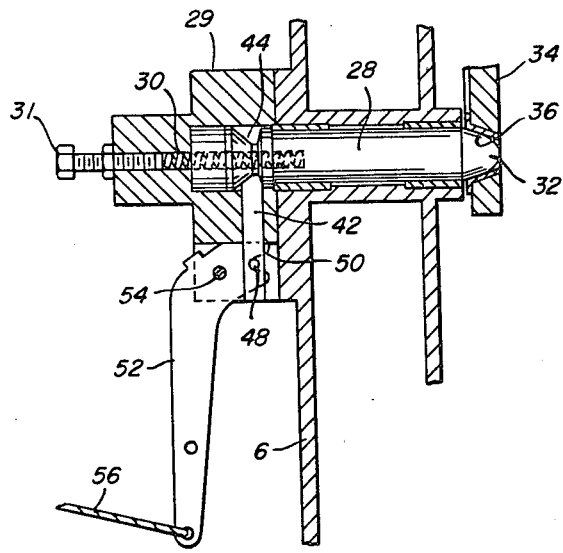
FIGURE 4 is a detail sectional view taken through lines IV—IV of FIGURE 1.

To hold the beam 8 securely in either its solid line position or its chain line position 8′ (FIGURE 1), a pin 28, shown in dotted lines in FIGURE 3 and in detail in FIGURE 4, is slidably mounted through a hole in one of the support members 6. The rear end of pin 28 is supported in a housing 29 mounted on the side of support member 6 (FIGURE 4). A compression spring 30 is mounted against the rear end of the pin 28 and the compression of the spring 30 is adjustable by a bolt 31 that is threadably engaged in housing 29. The pin 28 has a rounded head 32 which is pressed by the spring 30 against a quadrant member 34 depending from one of the flanges 12 of beam 8 (FIGURE 3). A recess or hole 36 in quadrant member 34 is positioned so that it lines up with pin 28 when the beam 8 is in its solid line position of FIGURE 1. Similarly, another recess or hole 38 in quadrant member 34 lines up with the pin 28 when the beam 8 is in its chain line position 8′ (FIGURE 1). Thus, when the beam 8 is in either of these positions, the spring 30 pushes the head 32 and pin 28 into recess 36 or reces 38. While the beam 8 is rotated between its solid line position and chain line position 8′, the head of pin 28 rides over an arcuate wearplate 40 extended between recess 36 and 38 on quadrant member 34 (FIGURE 1).

Due to the rounding of head 32 of pin 28, any force exerted on this head by the walls of recess 36 or 38 tends to depress the pin 28 against spring 30 and allow the beam 8 to rotate. To prevent the beam 8 from rotating when not desired, a latch 42 is inserted within a circular notch 44 at the rear of pin 28 (FIGURE 4). The latch 42 slides vertically within a passageway in housing 29, and at bottom of latch 42 is a pin 48 which rides within slot 50 of a lever 52. Lever 52 is rotatably mounted about pin 59 on the bottom of housing 29 and has a center of gravity such that its longer portion swings downward and toward the side of support member 6, forcing the latch 42 upward into notch 44 of pin 28. A lanyard 56 is tied to the lower end of lever 52 and is used to pull the lever 52 outwardly, thereby pulling the latch 42 downward and out of engagement with notch 44 of pin 28.

An energy absorbing cylinder 60, equipped with a pressure means such as spring 61 (FIGURE 2), is mounted between the base 4 and the under side of platform 18 at a point that is to the left of pin 14 (FIGURE 1) and is preferably beneath the coil C on top of platform 18. The lower end of cylinder 60 is rotatably connected to base 4 by pin 62, and the piston rod 64 extending from the upper end of cylinder 60 is connected to the underside of platform 18 by pin 66. While the beam 8 is rotating from its solid line position to its chain line position 8′ with the coil C resting on platform 18 and cradle member 20, the energy absorbing cylinder 60 dampens the downward travel of the coil C and brings the beam 8 to a gentle rest against the bumper 26.

When there is no coil C resting on the platform 18, the center of gravity of beam 8 is to the right of its axis of rotation through pins 14, as viewed in FIGURE 1. Thus, the beam 8 in its unloaded state has a natural tendency to rotate clockwise, until its legs 24 come to rest against resilient bumpers 22 on base 4, with the pin 28 snapping into recess 36 of quadrant 34.. When a coil C is set down on top of platform 18 by a crane or other unloading device, the center of gravity of beam 8 with coil C shifts to the left side of its axis of rotation through pin 14. However, due to the latch 42 holding the pin 28 within recess 36, the beam 8 will still remain with its legs 24 on resilient bumpers 22.

To rotate the coil C and the beam 8, a workman simply pulls on lanyard 56, thereby withdrawing latch 42 from notch 44 in pin 28. The load of coil C on the beam 8 is transmitted through the wall of hole 36 to the round head 22 of pin 28, causing the pin to be pressed backward against spring 30 and out of engagement with hole 36. Thus freed from the pin 28, the beam 8 rotates counterclockwise about pins 14 until it comes to rest against bumpers 26. The pin 28 then snaps into engagement with recess 36 in quadrant 34, and the latch 42 again rides upwardly into engagement with notch 44, due to lever 52 rotating by gravity toward the side of support member 6. With the beam 8 now in its chain line position 8′, the coil C has been rotated from its center line vertical position to a center line horizontal position, and the coil C is ready to be lifted off the cradle member 20.

Upon removal of the coil C from beam 8, the center of gravity of beam 8 is then shifted back to the opposite side of its rotational center line through pins 14. However, the beam 8 is prevented from rotating back to its original position by the pin 28 which is locked in recess 38. In order to rotate the beam 8, lanyard 56 must be pulled again to release latch 42 from notch 44 in pin 28 and allow the pin 28 to be depressed against spring 30. When the lanyard 56 is thus pulled, the beam 8 is permitted to rotate clockwise back to its original solid line position, where it again engages resilient bumpers 22. Pin 28 snaps back into recess 36, and the beam 8 is ready to receive another coil C.

In addition to dampening the counterclockwise motion of beam 8 by means of cylinder 60, it may also be desirable to place shock absorbers 70 between the base 4 and the right hand end of beam 8, as viewed in FIGURE 1. When the beam 8 is returning from its dotted line position 8′ back to its original solid line position, the shock absorbers 70 will absorb the shock of legs 24 of beam 8 as they hit the resilient bumpers 22. The shock absorbers 70 are preferably mounted on angles 72 on base 4 and have heads 76 which are positioned for engagement with fingers 78 depending from the beam 8. However, the shock absorbers 70 may be mounted instead on the beam 8 with their heads 76 positioned for engagement with steel angles 72 on base 4.

In lieu of constructing the beam 8 so that its center of gravity is normally to the right of its center line of rotation through pins 14 (FIGURE 1) when the beam is unloaded, the spring 61 in cylinder 60 may be made with sufficient spring force to cause the beam 8 to rotate to its solid line position against bumpers 22 when no other loading is applied to the beam 8.

A pin 81 and arm 82 (FIGURE 3) may be used to lock the lever 52 so that it cannot be pulled outwardly, and inadvertently cause the beam 8 to rotate. The arm 82 is rotatably mounted on one of the support members 6 and adjacent to the lever 52. Pin 81 is inserted through holes in lever 52 and arm 82, thereby locking the lever 52 in its inward position.

While several embodiments of our invention have been shown and described, other modifications and adaptations may be apparent within the scope of the appended claims.

We claim:
1. Apparatus for turning a product comprising
a base member,
a beam rotatably mounted on said base member about a non-vertical axis,
a product holding means mounted on one end of said beam,
a first stop means mounted on said base member and positioned to stop the rotation of said beam when said product holding means is in an elevated position,
a second stop means mounted on said base member and positioned to stop the rotation of said beam when said product holding means is in a lowered position,
said beam with no product held thereon having its center of gravity on the opposite side of said non-vertical axis from said product holding means, so that said beam is rotated by gravity against said first stop means and said product holding means is lifted to said elevated position,
said beam together with a product held by said product holding means having a center of gravity on the same side of said non-vertical axis as said product holding means, so that said beam is rotated by gravity against said second stop means and said product holding means and product held thereby are rotated from said elevated position to said lowered position,
a pin slidably mounted on said base member and having its front end pointing toward one side of said beam,
said beam having first and second recesses in one side which are respectively aligned with said pin when said beam is in engagement with said first and second stop means,
pressure means mounted on said base member pressing said pin into one of said recesses when the recess is aligned with said pin,
means for locking said pin in its position in one of said recesses,
said pin having a front end rounded so that when said locking means is withdrawn from said pin, lateral pressure on said rounded pin end from the wall of one of said recesses presses said pin back against said pressure means and out of engagement with said recess, thereby allowing said beam to rotate until the other recess is aligned with said pin.
2. The apparatus of claim 1 wherein
said pin has a notch in its side wall, and
said means for locking said pin includes:
a latch slidably mounted on said base member and aligned with said notch in said pin when the pin is lodged in one of said recesses, and
a lever rotatably mounted on said base member about a non-vertical axis, said lever having one end connected to said latch and the center of gravity of said lever being such that the lever normally pushes said latch into the notch in said pin when the latch is aligned therewith.
3. Apparatus of claim 2 in which
said first stop means includes a resilient bumper facing upwardly and mounted on said base member so as to engage said beam on the opposite side of said non-vertical axis from said product holding means and support said beam in a substantially horizontal position, and
said second stop means includes another resilient bumper facing in a direction substantially perpendicular to the direction of said first stop means and mounted on said base member so as to engage said beam on the same side of said non-vertical axis as said product holding means and stop the motion of said beam when the beam is in a substantially vertical position.
4. Apparatus for turning a product comprising
a base member,
a beam rotatably mounted on said base member about a non-vertical axis,
a product holding means mounted on one end of said beam, a first stop means mounted on said base member and positioned to stop the rotation of said beam when said product holding means is in an elevated position, a second stop means mounted on said base member and positioned to stop the rotation of said beam when said product holding means is in a lowered position, said beam with no product held thereon having its center of gravity on the opposite side of said non-vertical axis from said product holding means, so that said beam is rotated by gravity against said first stop means and said product holding means is lifted to said elevated position, said beam together with a product held by said product holding means having a center of gravity on the same side of said non-vertical axis as said product holding means, so that said beam is rotated by gravity against said second stop means and said product holding means and product held thereby are rotated from said elevated position to said lowered position, an energy adsorbing cylinder connected between said base member and said end of said beam on which said product holding means is mounted, said energy absorbing cylinder being positioned to dampen the downward motion of said first end of said beam on which the product holding means is mounted, and a shock absorbing cylinder mounted for engagement between said base member and a portion of said beam on the opposite side of said non-vertical axis from said product holding means, said second shock absorbing cylinder being positioned to dampen the motion of said beam immediately prior to its coming to rest on said first stop means.

5. Apparatus for turning a product comprising
a base member,
a beam rotatably mounted on said base member,
a product holding means mounted on said beam,
a pin slidably mounted on said base member and having its front end pointing toward one side of said beam, said beam having first and second recesses in one side which are respectively aligned with said pin at first and second positions of said beam, pressure means mounted on said base member pressing said pin into one of said recesses when the recess is aligned with said pin, means for locking said pin in its position in one of said recesses, and said pin having a front end rounded so that when said locking means is withdrawn from said pin, lateral pressure on said rounded pin end from the wall of one of said recesses presses said pin back against said pressure means and out of engagement with said recess, thereby allowing said beam to rotate until the other recess is aligned with said pin.

6. The apparatus of claim 5 wherein
said pin has a notch in said side wall, and
said means for locking said pin includes:
    a latch slidably mounted on said base member and aligned with said notch in said pin when the pin is lodged in one of said recesses, and
    a lever rotatably mounted on said base member about a non-vertical axis, said lever having one end connected to said latch and the center of gravity of said lever being such that the lever normally pushes said latch into the notch in said pin when the latch is aligned therewith.

References Cited

UNITED STATES PATENTS

| | | | |
|---|---|---|---|
| 1,745,381 | 2/1930 | Ray | 214—130 |
| 2,345,728 | 4/1944 | Claus et al. | 214—130 |
| 2,495,138 | 1/1950 | Royle | 214—142 X |

HUGO O. SCHULZ, *Primary Examiner.*

UNITED STATES PATENT OFFICE
CERTIFICATE OF CORRECTION

Patent No. 3,395,813                                                 August 6, 1968

Theodore B. Bruce et al.

It is certified that error appears in the above identified patent and that said Letters Patent are hereby corrected as shown below:

Column 1, line 68, "cardle" should read -- cradle --.
Column 2, line 36, "reces 38" should read -- recess 38 --.
Column 5, line 21, "adsorbing" should read -- absorbing --;
line 25, "said first end" should read -- said end --.

Signed and sealed this 30th day of December 1969.

(SEAL)
Attest:

Edward M. Fletcher, Jr.                             WILLIAM E. SCHUYLER, JR.
Attesting Officer                                            Commissioner of Patents